United States Patent [19]
Bailey

[11] 3,733,832
[45] May 22, 1973

[54] TROUGH STRUCTURE

[76] Inventor: Todd D. Bailey, 2767 Olive Highway, Oroville, Calif. 95965

[22] Filed: Aug. 18, 1969

[21] Appl. No.: 850,814

[52] U.S. Cl. ..................................61/15, 29/453
[51] Int. Cl. .................................................E02b 9/04
[58] Field of Search..........................61/14, 15, 12; 52/11-15, 75-78; 29/155, 453; 193/2, 25

[56] References Cited

UNITED STATES PATENTS 1,746,965   2/1930   Porter.................................29/453 X

*Primary Examiner*—J. Karl Bell
*Attorney*—Gordon Wood

[57] ABSTRACT

A trough structure particularly adapted for use as an irrigation trough or flume which is formed from a plurality of rectangular sheets of relatively inexpensive material such as corrugated roofing and which is supported above the ground by portable supports spaced apart longitudinally of the path of the trough. The ends of adjacent sheets of material are secured in lapping relationship to each other at said supports and means is provided for preventing leakage at the lapped seams.

2 Claims, 9 Drawing Figures

Patented May 22, 1973

INVENTOR
TODD D. BAILEY
BY
Gordon Wood

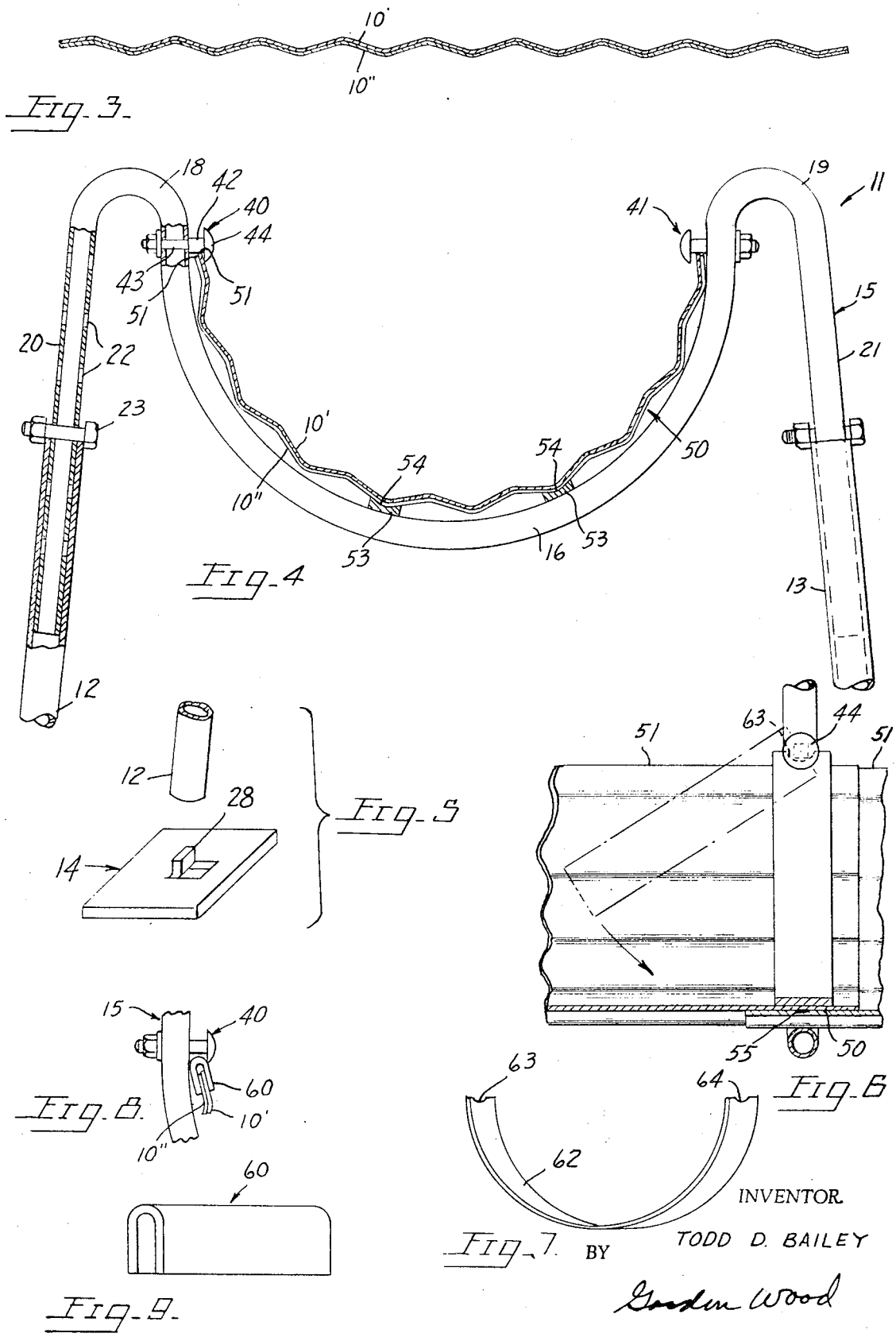

TROUGH STRUCTURE

This invention relates to a trough structure and more particularly to a water carrying trough which is particularly adapted for irrigation purposes. Heretofore the two prevalent methods of irrigating have been by means of ditches dug in the ground or by means of pipe usually resting on the ground. Both of these methods are relatively expensive and have certain disadvantages which impair their utility.

The relatively expensive ditch method of irrigation has the disadvantage of permitting a considerable quantity of water to be lost by seepage into the ground and by loss of water through holes formed by burrowing animals and through cracks in the earth. The high expense of maintaining irrigation ditches is aggravated by the fact that weed growth promoted by the water must be prevented or removed. In addition, the space occupied by the ditch is lost in so far as its use for growing crops is concerned.

The expensive pipe method of irrigation has the disadvantage of requiring a considerable amount of time and expense in running the pipe along the desired path. Furthermore, the pipe method is inherently uneconomical in the sense that for the amount of pipe periphery employed the volume of water that can be carried is considerably less than by an upwardly opening trough. In addition, the original cost is greatly increased by the expense of transporting the pipe which takes up a great amount of space.

The main object of the present invention is to overcome the disadvantages of prior art methods of irrigation and particularly those methods involving ditches dug in the ground and the use of pipe.

Another object of the invention is the provision of a method and apparatus for forming an irrigation trough which is considerably less expensive than irrigation methods and structures heretofore employed.

Yet another object of the invention is the provision of a method and trough structure for conducting a maximum amount of water for the periphery of the trough employed.

Another object of the invention is the provision of an irrigation trough structure which lends itself to use on irregular terrain and which is portable and quickly erected by inexperienced personnel.

Another object of the invention is the provision of an irrigation trough which minimizes the loss of water by preventing leakage and which is not susceptible to damage by earth burrowing animals, earth cracking and weed growth and which does not occupy a space which might otherwise be employed for growing crops.

Other objects and advantages of the invention will be apparent from the following Specification and from the drawings.

FIG. 3 is a cross sectional view of the lapped portion of a pair of corrugated sheets from which the trough is formed.

FIG. 4 is a greatly enlarged cross sectional view of the trough at one of the support members showing one method by which the lapped portion of the trough is secured to said support.

FIG. 5 is a perspective of a base showing the manner in which it is secured to the lower end of a supporting leg.

FIG. 6 is a fragmentary longitudinal section through the trough showing another method of securing the lapped portion to the support.

FIG. 7 is a perspective of the semicircular securing member of FIG. 6.

FIG. 8 is a fragmentary view showing another method of securing the trough to the support.

FIG. 9 is a perspective of the U-shaped tightening element of FIG. 8.

Figure 1:
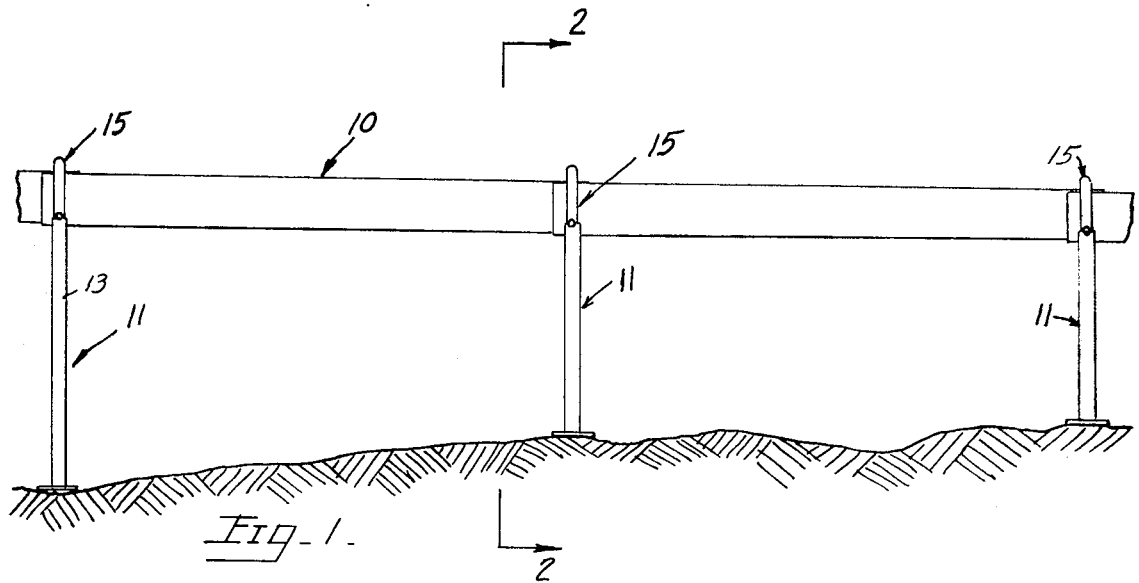
FIG. 1 is a small scale side elevational view of a typical portion of the irrigation trough.

In detail and first with reference to FIG. 1, the invention comprises a trough generally designated 10 which is supported above the ground at spaced points along its length by supports generally designated 11. As will be seen later on in greater detail, the supports 11 each comprises a pair of legs 12, 13 (FIG. 2) which are secured at their lower ends to base members 14.

Although the supports 11 may take various forms a preferred form is shown in FIG. 4 wherein a saddle generally designated 15 is supported above the ground by means of the legs 12, 13. In this case the legs 12, 13 telescopically receive the ends of the saddle 15.

Although the saddle 15 may be formed from a flat bar of metal, or cast from plastic or by any other suitable means, the embodiment of FIG. 4 is formed from a length of standard pipe and includes a generally semicircular portion 16 provided with a pair of return bends 18, 19 at its opposite ends and downwardly and outwardly diverging terminal portions 20, 21. These terminal portions 20, 21 are each provided with a row of holes 22 which are adapted to receive a bolt 23 therethrough resting on the upper end of the associated pipe leg so as to secure the saddle 15 at any desired adjustable elevation when said terminal portions are received within the upper ends of the pipe legs 12, 13.

Figure 2:
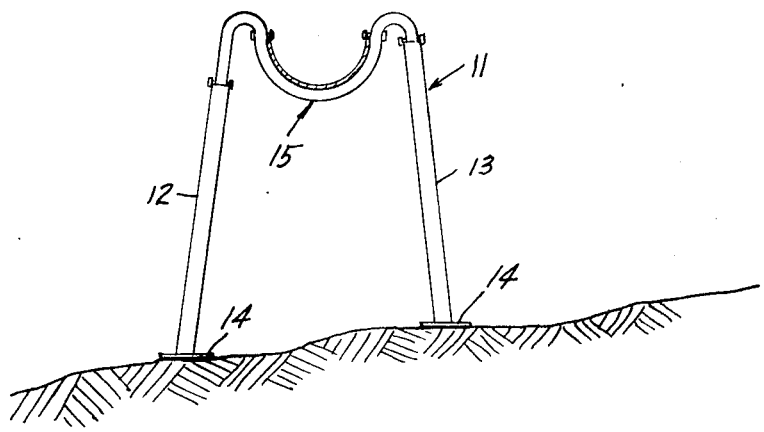
FIG. 2 is a small scale cross sectional view of the irrigational trough of FIG. 1 as taken in a plane indicated by lines 2—2 of FIG. 1 and showing the base of the trough structure.

At the lower end of each leg 12, 13 a base 14 is provided formed from a section of sheet material from which an upwardly projecting tongue 28 is struck and adapted to be received within the lower end of the pipe leg. As best seen in FIGS. 1 and 2, this readily adjustable but rigid support structure permits the trough 10 to be erected over irregular terrain and at the same time permits the predetermined gentle slope of the trough to be established accurately in order to carry out the irrigation effectively.

At the upper ends of the semicircular portion 16 of the saddle 15 there are provided a pair of abutments 40, 41 which may conveniently be conventional carriage bolts provided with an enlarged section 42 between the shank 43 and the head 44. The bolt shank is passed through a suitable aperture in the pipe at the juncture between the semicircular portion 16 of the saddle and the return bend portion.

In FIG. 3 there are shown, in spaced relationship with the saddle 15, a pair of rectangular sheets 10', 10" which in this case are sheets of conventional steel corrugated roofing the gage of which may vary from about 0.02 to about 0.1 depending upon the spacing desired between supports 11. In forming the trough 10 the sheets 10', 10" (FIG. 3) are urged downwardly into the saddle 15 with their adjacent margins lapped as indicated in FIG. 6. As the sheets 10', 10" are urged downwardly at their central portions between the abutments 40, 41, the sheets are bent to an arcuate shape transversely of the trough until the longitudinally extending side edges of the sheets pass the bolt heads 44 so that when the downward pressure on sheets 10', 10'' is released the side edges 51 snap into the space between the heads 44 and the saddle 15 and into engagement with the downwardly directed surfaces of enlarged sections 42. In order to effect this method of assembly it will be apparent that the length of the inwardly directed surface of the semicircular portion 16 of the saddle between bolts 40, 41 must be greater than the width of the sheets 10', 10'' so that as said sheets snap into place against the abutments 40, 41 a space remains between the bottom of the lower sheet 10'' and the inwardly directed surface of semicircular portion 16 (see FIG. 4). In order to complete the assembly and to insure a tight seal between the opposed surfaces of the lapped portion 50 of sheets 10', 10'' a pair of wedges 53 may be driven into the space between the lower sheet 10'' and the saddle 15. It has been found that a tighter joint is established if the wedges 53 are formed with an arcuate longitudinally extending groove 54 along their upper sides so as to conform to the convex portions of the corrugated sheets 10''. If the wedges are driven into the concave portions of the corrugations it has been found that leakage is more likely to occur.

Although an exceptionally good tight joint is achieved by the above described method of assembly, it is preferable to provide some sort of sealing means between the opposed surfaces of the lapped portion 50 of the sheets 10', 10''. Such sealing material may be a bitumastic material in plastic form spread on the lapped portions at assembly or, preferably, a ribbon of elastomeric material or other suitable resilient material may be applied between said lapped portions and extending between the longitudinally extending side edges of the sheet as indicated at 55 in FIG. 6. It will be apparent that the sheets 10', 10'' nest so closely that the cross sectional extent of the ribbon 55 need not be very great to effect a perfect seal against leakage.

It will be apparent that the above described trough structure may be erected quickly by one or more men and that literally miles of trough may be assembled in one day. It will be appreciated that one vehicle can be employed to transport an extremely large number of sheets of the trough forming material and, since there are no complicated assembly steps required to be performed, each saddle and its associated sheets may be erected and assembled in a matter of minutes. Furthermore, it will also be apparent that disassembly of the trough is a simple matter since removal of the sheets requires only the hammering out of the wedges 53 to permit the sheets to be removed from the saddle supports.

The present invention also contemplates the provision of abutments similar to abutments 40, 41 that may be made adjustable and tightened in the longitudinal side edges of the corrugated sheets. However, this sort of structure is not preferable since the greatest economies in erection of the structure are effected by minimizing the manual minipulations involved at assembly.

An alternative form of tightening means which may be employed with or without the wedges 53 is shown in FIGS. 8, 9. In this case a tightening effect between the lapped portions of adjacent sheets may be achieved by driving a U-shaped clip 60 formed of sheet metal or the like between the upper edges of the sheets and the abutment surfaces 43 of the abutments 40, 41 (FIG. 8). This tightening means has the advantage of simplicity and not requiring complicated screw threaded elements which may become rusted and inoperative.

Still another method of effecting a water tight assembly is shown in FIGS. 6, 7. In this case a relatively stiff semi-circular strap 62 is provided with a pair of notches 63, 64 at its end edges adapted to engage abutments 40, 41 respectively. By swinging the strap about the abutments as indicated in FIG. 6 it will be seen that a wedging effect is produced along the entire semicircular inner periphery of the lapped portion of the trough causing the sheets to be compressed tightly together and against the semicircular portion of the saddle. In this connection it will be understood that the fabrication of the saddle 15 may be done extremely accurately and the abutments 40, 41 located relative to the semicircular portion 16 of the saddle so as to obtain a predetermined amount of tightness in the lapped joint.

The present invention contemplates other variations of the particular structure described above. For example, the sheets of trough forming material may be made of any suitable material, including plastic, and need not necessarily be formed with corrugations. However, it will be apparent that the corrugations such as are formed in standard roofing and siding greatly improve the rigidity of the trough so that the spacing between the supports 11 may be relatively large thus reducing the number of supports required and also the expense of forming the finished structure. Naturally the semicircular cross section also contributes to rigidity of the structure.

One of the important features of the invention is that no useable land need be lost because of the presence of the trough and it is possible to grow many types of crops under the elevated trough structure if desired.

With respect to the effectiveness of the structure it will be apparent that the semicircular periphery of the trough permits a maximum volume of water conveyed whereas in the case of conventional round pipe the maximum amount of water that can be conveyed with the equivalent periphery of conduit is only one-half of that conveyed by the semicircular conduit of the present invention.

The repair of damage to the irrigation trough is simplified in that a damaged sheet of trough material may readily be removed without affecting the water supply by providing a readily installed dam of semicircular shape on each side of the damaged sheet and replacing the damaged sheet without loss of a substantial amount of water.

Since most agricultural land is level, it will be apparent that the legs 12, 13 will not be required for most of the trough length and that only the saddle 15 need be used. In such a case the terminal portions 20, 21 of the saddle may be connected to bases 14.

In the following claims the characterization of the sheets as initially "planar" is intended to include corrugated sheet, the general shape of which is planar except for the local corrugations.

I claim:

1. The method of forming an irrigation trough or the like along an elongated path from a plurality of serially connected trough sections comprising the steps of:
  establishing a pair of abutments spaced apart transversely of said path,
  disposing an elongated sheet of resilient material longitudinally of said path and over said abutments, urging said sheet downwardly at its central portion between and past said abutments to bend said sheet transversely to an arcuate cross sectional contour, and permitting the side edges of said sheet to engage said abutments to hold said sheet to said arcuate contour, thereby forming one trough section, successively repeating the above mentioned steps with other similar sheets and with each successive sheet in overlapping relation at one of its ends with the adjacent end of the preceding sheet.

2. The method of claim 1 wherein said central portion of said sheet is supported by an upwardly directed force while said longitudinal side edges are in engagement with said abutments.

* * * * *